Jan. 14, 1936.  J. R. BLAKESLEE  2,027,416
ELECTRIC HEATING APPARATUS
Filed May 10, 1932  8 Sheets-Sheet 1

INVENTOR
John R. Blakeslee,
BY Justin W. Macklin.
ATTORNEY

Jan. 14, 1936.   J. R. BLAKESLEE   2,027,416
ELECTRIC HEATING APPARATUS
Filed May 10, 1932    8 Sheets-Sheet 3

Jan. 14, 1936.   J. R. BLAKESLEE   2,027,416
ELECTRIC HEATING APPARATUS
Filed May 10, 1932   8 Sheets-Sheet 5
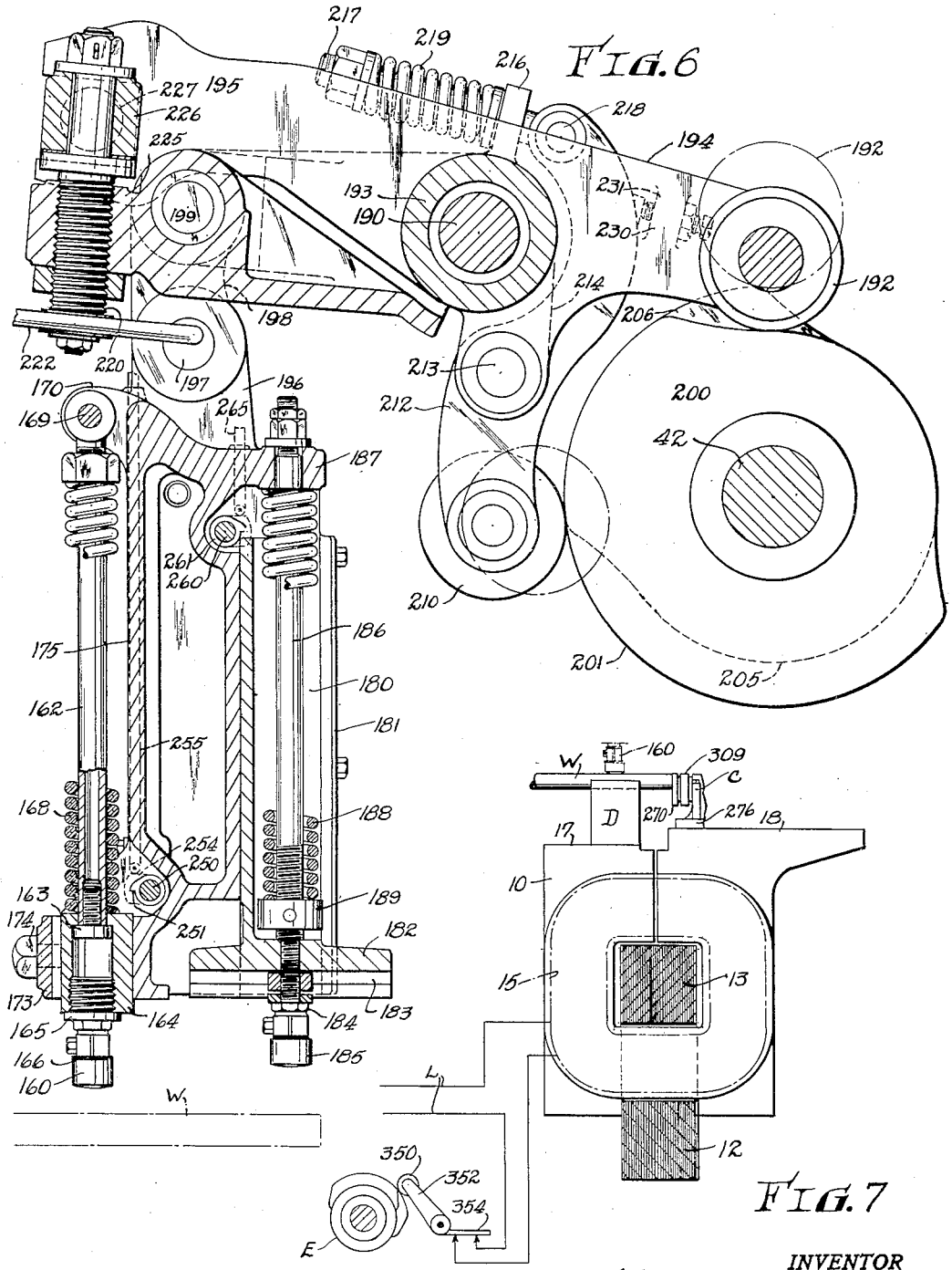
INVENTOR
John R. Blakeslee,
BY Justin W. Macklin,
ATTORNEY Jan. 14, 1936. J. R. BLAKESLEE 2,027,416
ELECTRIC HEATING APPARATUS
Filed May 10, 1932   8 Sheets-Sheet 8

INVENTOR
John R. Blakeslee,
BY Justin W. Macklin,
ATTORNEY

Patented Jan. 14, 1936

2,027,416

UNITED STATES PATENT OFFICE 2,027,416

ELECTRIC HEATING APPARATUS

John R. Blakeslee, Willoughby, Ohio, assignor to The Ajax Manufacturing Company, Euclid, Ohio, a corporation of Ohio Application May 10, 1932, Serial No. 610,379

18 Claims. (Cl. 219—11)

This invention relates to methods and means of electrically heating metal articles, for subsequent treatment, such as forging and shaping by upsetting and the like.

An object of the present invention is to provide for electrically heating a plurality of metal objects such as rods by a step by step method, and the provision of means for conveying the metal articles to be heated and to present them to a series of current carrying contactors successively for predetermined lengths of time, delivering them from a machine, and an object is to accomplish this in a highly convenient, economical and expeditious manner.

A further object is to so construct the machine that it is adapted for the heating of metal articles of various shapes and sizes and of various metallurgical structures, and also to provide a machine which may be so accurate and regular in its heating and delivering of these articles that it may be physically and mechanically connected with other apparatus such as forging, bending and upsetting devices and machines to which the heated blanks may be delivered at regular predetermined intervals.

A further object is to heat definite portions of the articles to very precise limits in the shortest possible time and without injury to the metallurgical structure or grain structure of the article.

In carrying out the above objects I am enabled by the present invention to cause the heating of the metal articles to be progressively applied, and substantially from a zone within the article outwardly and whereby the full uniform temperature is reached at the exterior of the last stage of application of heating current with many advantageous results, greatly reducing possibility of damage resulting from such heating, and in some instances improving the grain structure of the metal article by reason of such heat treatment.

An advantageous result of the present invention is the reduction of time of full heat at the surface to a minimum, with the result that surface oxidation is greatly reduced.

The step by step application of the heat, that is, the subjecting of the articles to be heated successively to the current carrying contactors and the provision of an intermediate dwell period is arranged to accomplish very advantageous results in bringing about the uniform heating throughout the body being heated. In this connection it is a further object to so control the application of heating current and dwell periods that portions of the article, such for example as a rod, may be heated for a given length very uniformly, while the remaining portion is unheated, and further that the heat application may be by the present invention so accurately applied as to attain the exact temperature desired, eliminating the difficulties resulting from any overheating or underheating.

The present invention is illustrated as embodied in a preferred form of machine, and a further object is to so construct the machine that it may function to carry out the above named objects efficiently, and that it shall be capable of being economically manufactured, shall be very durable in use, and be capable of adjustment for various sizes and shapes of articles to be heated under various conditions.

A more specific object includes the provision of adjustable means for controlling the time during which the heat may be applied to any given number of articles being treated.

Other objects include the arrangement of a simple compact transformer means and contactor mechanism, eliminating the use of the usual flexible connections to one or more contactors, cables or laminated members of copper bands heretofore frequently used, and which are a source of expense and difficulty in maintenance and upkeep.

Various other more specific objects will become apparent from the following specification which relates to the drawings, illustrating a preferred embodiment of the present invention. It is to be clearly understood that the apparatus shown in the drawings is subject to various modifications and substitutions without departing from the spirit of my invention.

In the accompanying drawings—

Fig. 6 is an enlarged sectional detail of the contact carrier and adjustable actuating means.

Fig. 7 is a diagrammatic view of the transformer and contactors illustrating a heating circuit through the work or articles to be heated and adjusting means controlling the time of heating current application.

Figure 1:
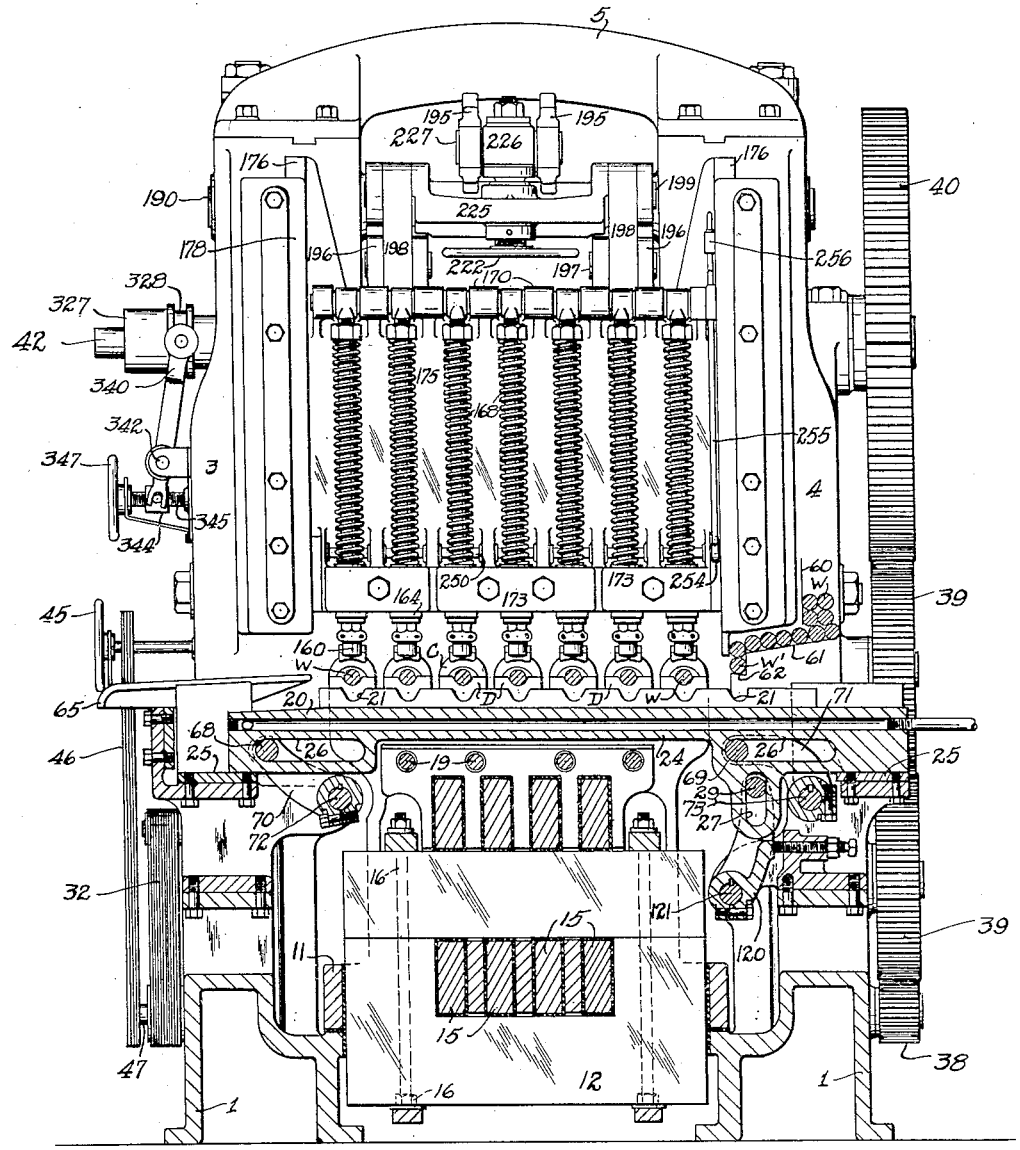
Fig. 1 is a front elevation of a preferred form of my machine, some of the parts being shown in section.

Describing the drawings by the use of reference characters a suitable frame construction is illustrated as comprising a base portion 1, from which rise end wall supporting standards 3 and 4 suitably connected by a bracing bridge 5 at the top. The entire frame is made in sections, to facilitate easy assembly, with the shafts and other parts supported thereby. The base portion is suitably shaped to provide supports for a frame which comprises the secondary of the heating transformer. This frame is shown diagrammatically at 10 in Fig. 7 and comprises essentially a hollow broad U-shaped structure with separated transverse end members 11 resting upon suitable shoulders on the base and its length therefrom and embracing the core 12 of the transformer. The frame is shown as forming a series of separated recesses for receiving the separated coils 15 of the primary of the transformer, above which the frame 10 has two table-like portions 17 and 18 on which the contactors are mounted, which bring the heating current to the work or article to be heated as indicated at W (Figs. 1, 3 and 7).

Figure 2:
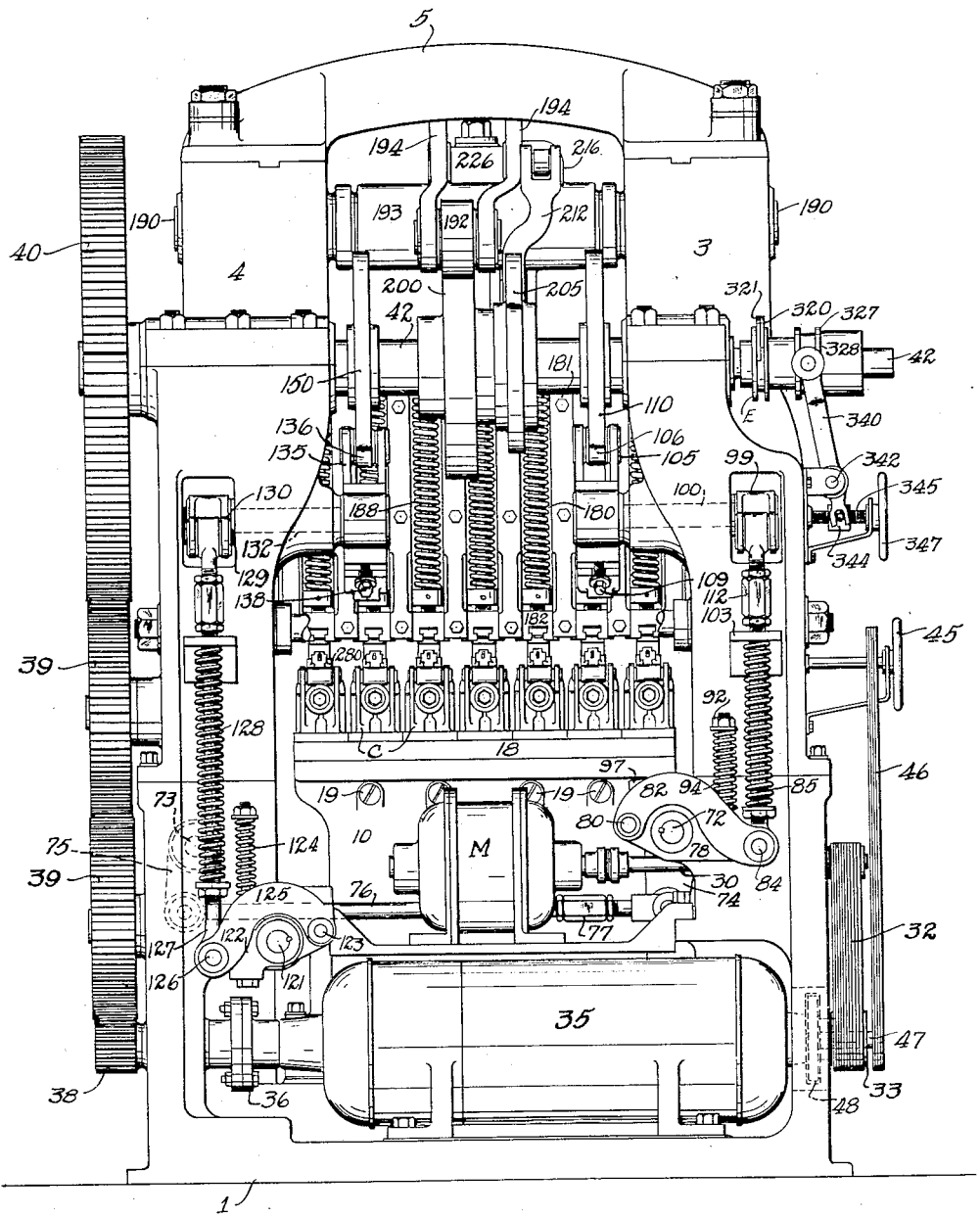
Fig. 2 is a rear elevation of the same.

It will be noted that the width of the table surfaces 17 and 18 is sufficient to carry a plurality of these contactors for a number of stations, there being seven as shown (Figs. 1 and 2). These contactors are designated generally C and D, the contactor C of which has movable mechanism for engaging the end of the work, while the contactor D receives and supports a portion of the work at a predetermined distance from the end to be heated, thus establishing the distance or amount of stock to be heated.

Figure 3:
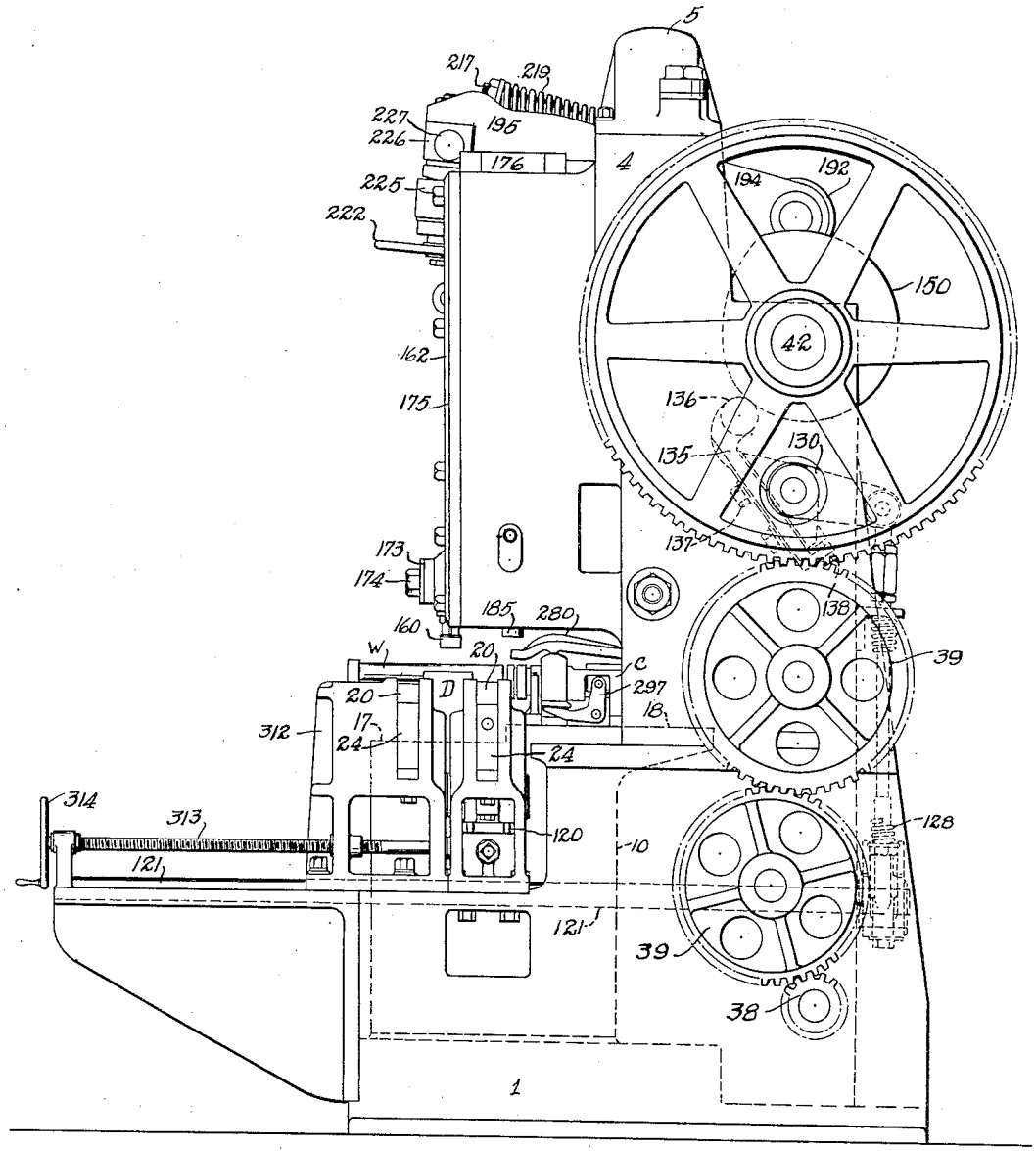
Fig. 3 is a side elevation looking at the machine from the right hand side of Fig. 1.

The mechanism for bringing the work to the contactors, feeding them one at a time, and advancing them step by step and simultaneously, in the form shown, includes a pair of rack bars 20 extending transversely of the machine (Figs. 1 and 3). It has mechanism for moving them transversely the distance of that from one station to another or from a pair of contactors C and D to another.

The means for actuating the work feeding and contactor mechanism comprises a gearing and shafts driven by a suitable motor M. A timing mechanism governing the length of time in which the current is applied is shown in diagrammatic form at E in Fig. 7, and is actuated from the operating mechanism, as will later appear.

*The transformer*

The transformer may be of any suitable character, but as previously indicated, it comprises essentially a U-shaped casting having a longitudinal opening for receiving one leg 13 of the core 12. Spaced along the core space and transversely thereof are recesses for receiving a series of primary coils 15, which receive their current from a line indicated by the wires L, Fig. 7, during periods governed by the timing mechanism E. The core member 13 is preferably bolted to the U-shaped section of the core 12 embracing the lower side of the coils 15, the core parts being suitably secured together by clamps and bolts indicated at 16, while the frame member is shaped to receive these parts and comprises in effect a U embracing one leg of the core, with its gap above the core where insulation is provided. For rigidity, transverse bolts indicated at 19 extend through the transformer casting or frame (as seen in Figs. 1 and 2).

*Driving mechanism*

From the motor M the shaft 30 extends outwardly through the frame and carries a suitable pinion for a sprocket chain driving connection or the like, as indicated at 32, which in turn drives the sprocket gear 33 on one shaft of suitable change gear mechanism contained in one housing 35, mounted on an extension of the base 1. Through a suitable coupling 36 on the driven shaft of the change speed gearing, power is transmitted to a driven pinion 38 and through a pair of idlers 39, and the main shaft gear 40 mounted on the main actuating shaft 42. The speed change of the mechanism 35 is effected by a hand wheel mounted to be within easy reach, as indicated at 45, and connected through a sprocket chain or the like 46, comprising a part of the speed change mechanism, and through a shaft 47 operates a speed changing gear 48 shown in broken lines, and comprises a standard part of the equipment of such speed change mechanisms.

The movement of the feeding mechanism and the contactors consists of reciprocating, oscillating or intermittent motions. These are effected primarily by cams on the main drive shaft and through rock shafts and rock arms which I now describe, with the respective mechanisms operated thereby.

*Feeding mechanism*

The conveying racks 20 are shown as provided with notches 21 spaced apart a distance corresponding to that of the distance between the heating stations, i. e., the spacing of the contactors, and there is preferably one more notch than there are stations. The work pieces or articles to be heated are preferably brought to the machine by means of the hopper having a suitable chute indicated diagrammatically at 60 and 61, shaped to provide a sloping runway at the end of which one piece at a time may drop downwardly and stand at the position of W', Fig. 1, ready to be picked up and moved laterally therefrom to the left by the notch 21 at the right. The movement of the rack bar is first vertically, picking up all of the work pieces and engaging the piece at W', and then while the rack is maintained at this level the movement is lateral for a distance corresponding to the spacing of the contactors, then downwardly and again to the right, returning to the position shown in Fig.

1. This rectangular movement, namely first upwardly, laterally to the left, downwardly, and then to the right, moves all of the bars being heated the distance from one station to another, and moves the fresh piece from the position at W' to the right at the first station, and brings the work piece at the left over a chute or apron 65, discharging the heated article or work piece from the chute consequent upon the downward movement of the rack bar. This downward movement permits another work piece to drop onto the shoulders 62 supporting it in a station indicated at W'. The shoulders are preferably slightly sloped as shown, to prevent inadvertent discharge from the feeding chute.

To accomplish the rectangular four-way movement, I have shown the rack bars carried upon a pair of transverse bridge-like members 24 and arranged in furrows, and normally resting upon bearing plates 25 carried on suitable brackets formed on the frame base at opposite sides of the machine. This bridging member is provided with horizontal slots 26 near its ends and at one end is a downward extension having a vertical slot 27 serving first as a guide for the upward movement, and also as a means for causing the lateral movements. The upward movement is accomplished by means of a transverse rod in each of the slots 26 rigidly connected with the ends of rock arms 70 and 71, spaced to receive the bridge member and rigidly connected with rock shafts 72 and 73 respectively. On the shafts 72 and 73 at the back of the machine are downwardly extending crank arms 74 and 75 respectively rigid with the shafts and pivotally connected by a rigid link member 76 preferably having therein a suitable adjusting means for alternate length, as indicated at 77. The rock shaft 72 is actuated by a rock arm 78 indicated particularly in Fig. 2 and in detail in Fig. 5. This arm receives an oscillating movement through an intermediate connection which governs a safety device for disconnecting the motor or opening the line to the driving motor M, and in turn is actuated from the main drive shaft through mechanism now to be described.

As stated, the arm 78 is keyed to the shaft 72. On one end, pivoted thereto at 80, is an arm 82 curving upwardly and over the shaft 78 across the same, and pivoted at 84 to a vertically movable actuating link 85. Opposite the pivot 80 the arms 78 and 82 are provided with abutting shoulders 88 and 89 respectively, the shoulder 88 comprising a suitable boss member through which passes a bolt member 90, having the head below the shoulder 88 and extending loosely through the shoulder member 89 for a distance above the same and provided at the upper end with a suitable nut and washer 92, to provide an abutment for a compression spring 94 acting normally to hold the boss members 88 and 89 together, and causing the arms 78 and 82 to swing as a unit. Rigid with the arms 78 is an upwardly projecting finger 95 carrying a suitable adjustable screw adapted to actuate a switch mechanism shown diagrammatically in Fig. 5 connected in line with the motor by wires indicated at 98.

Figure 5:
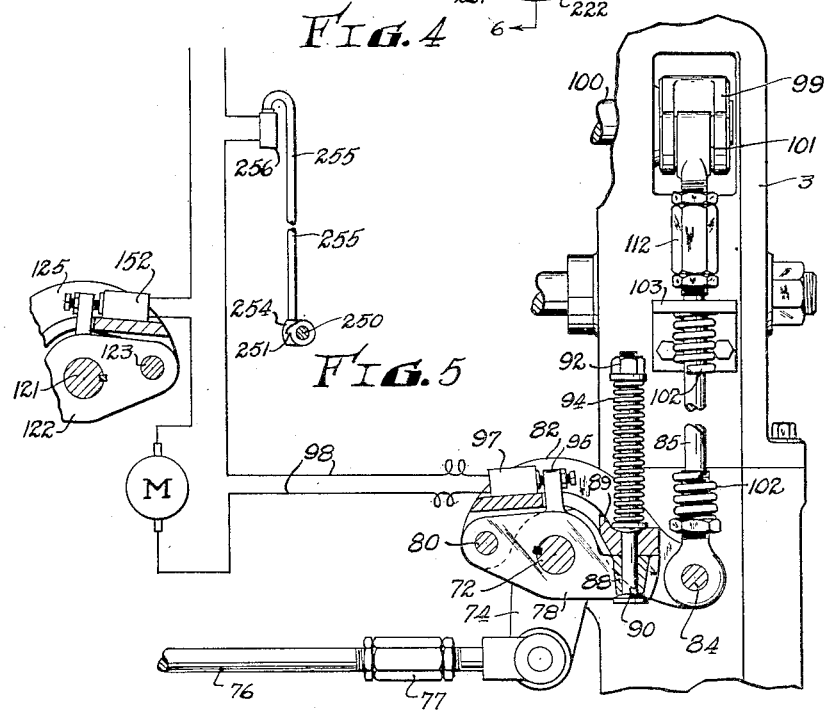
Fig. 5 is a sectional elevation of one of the means for actuating the stock feeding and moving means and its safety switch mechanism.

With the parts in position shown in Fig. 5, the switch is normally held closed, but upon undue resistance being offered to the shaft 72 from the links 74 and 75, as may occur when the rack bar strikes a work piece out of position or any interposed foreign article, the continued movement of the actuating link in Fig. 5 will cause separation of the shoulder members 88 and 89 and consequently swing the finger 95 away from the switch 97, which is set to normally open consequent upon the release of pressure from the finger 95, with the result that the motor line is opened and the motor stops at once.

The upper end of the link 85 is pivotally connected with the swinging end of a rock arm 99 on the shaft 100 and rigid with this arm 99 is a roller carrying extension 105 presenting its roller 106 against the cam 110 on the main actuating or cam shaft 42. Upon movement of the rock arm members 105 and 99 reciprocating the link 85, it will be seen that downward movement of the link 85 will swing the arm 75 and link 76 to move both of the pairs of arms 70 and 71 with their connecting shafts 68 and 69 longitudinally and upwardly in these slots, while the slot 27 is guided on another transverse rod or shaft 29 normally stationary during this period. Upon reaching the upward movement the shaft 29 is moved to cause the rack bar and carrier to move laterally. This lateral movement and its return is effected by swinging of the bifurcated crank arm 120 rigid on the shaft 121, having at the rear end of the machine a crank arm 122 with a coacting arm pivoted thereto at 123 and normally urged by a spring 124 toward the arm 122 as described in connection with the mechanism shown in Fig. 5, to which this mechanism corresponds. The end of the arm 125 is pivoted at 126 to the vertically reciprocating link 127 connected to a rock arm 130 by the pivot pin 129, also normally urged downwardly, as the link 85 is, by a spring 128. The arm 130 is mounted on a shaft 132 which is also provided at its other end with the rock arm 135 and having a roller 136 bearing against a cam 150 on the main cam shaft 42. These parts just described appear in broken lines in Fig. 3 and correspond with similar parts actuating the link 85. A suitable adjustment may be made between the link 130 and its extension arm carrying the roller 136 as by the slide bolts 137 and adjusting screw 138.

The actuation of the slide transversely thus results from the movement imparted by the cam 150 through the parts just described, link 127, arms 125, link 122 and shaft 121. A switch indicated at 152, may be actuated by the separation of the arms 122 and 125, as described in connection with the arms 78 and 82. This switch normally closed may open upon this movement and being connected in the line as indicated in Fig. 5, would also open the motor circuit, stopping the motor.

The shaping of the cams 110 and 150 is such as to cause the alternate actuation of the mechanism just described, first raising the transfer rack and then during a dwell period of the cam the shafts 68 and 69 and their arms 70 and 71 remain in the upper position, the arm 120 is actuated through the shaft 121 to move the rack bar 20 to the left, and at this point the dwell period occurs on the cam 150 and a sloping part of the cam permits the arms 70 and 71 to be rolled and then an active part of the cam 150 returns the arm 120 to the position shown in Fig. 1. Thus the return of movement of the slide is along its lower position free from interference with the work pieces deposited in the positions shown.

*Work contactor mechanism*

The contactors D may be of any suitable form, for example, just blocks of metal suitably selected and shaped, to produce high conductivity for the duration of current.

As shown in Fig. 1 and diagrammatically in Fig. 7, the contactor blocks D comprise rectangular blocks with a transverse notch or recess and the upper surface is shaped to receive and fit a substantial portion of the surface of the work pieces W. These are mounted upon one arm of the transformer secondary, being secured by a suitable means to the surface 17 in such manner as to provide for efficient conductivity.

The contactor C to be presently described is arranged to be movable toward and away from the end of the work piece at the time that a suitable pressure means is brought downwardly upon the top of the contactor block D. For convenience I will first describe this latter pressure means. As indicated, the work pieces illustrated are in the nature of round rod blanks which lie in the complementary recesses in the upper surfaces of the contactor blocks D. Pressure members 160 are mounted over each of the contactors. These are carried upon the ends of plungers comprising preferably a rod or tube 162 carrying an enlarged screw head 163 fitted into the bore of a slidable block 164, thus providing for relative movement between this block and the rod 162 while the block 164 is threaded to receive the carrier member 165 on which the pressure head member 160 is mounted, being provided with suitable insulation indicated at 166. A spring normally forces the head member downwardly so that when the contactor comes onto the work, further downward movement of the rod presses the spring creating the desired amount of pressure urging the work blank into its contactor recesses. The rod 162 is preferably pivoted to a transverse rod 169, extending through a series of suitable ears 170 upon a bridge slide 175. The blocks 164 are held by bridge cover members 173 secured by screws as indicated at 174, upon the removal of which the blocks and rods may be swung outwardly permitting convenient change of contactor heads and access to the parts behind.

The bridge slide 175 is shown as having parallel slide rails 176 fitted into suitable guideways indicated at 178 on the upright portions 3 and 4, whereby this bridge slide may be moved upwardly and downwardly moving the pressure members simultaneously.

The contactor members just described are mounted on the front side of the bridge slide and on the rear side are plunger members for actuating the contactor members C. These comprise a series of independent vertically slidable members 180, Figs. 2 and 6, mounted in guideways formed with movable securing strips 181 and each of the members 180 has an enlarged head 182 formed with a T slot 183 in which is mounted a clamping member 184 carrying the pressure member 185. The member 184 has a clamping screw adjustment by which it may be clamped in different positions along the T slot 183 to conform to the mounting of the contactors C in different positions for different lengths of work blank to be heated. Within the slide portion 180 are rods 186 extending upwardly through a guiding shoulder 187 and normally urged downwardly by a spring 188 acting on adjusting collar 189 threaded onto the lower end of the rod 186. Thus as the bridge slide 175 is moved downwardly the pressure member 185 meeting its coacting shoulder stops downward movement of the head 182 and slide 180, whereupon the spring 188 is compressed, creating the desired contacting pressure.

*Means actuating the contactor pressure members*

The movement of the bridge slide and contactor pressure members is effected from the main cam shaft 42. A horizontal pivot shaft 190 is journaled in the uprights 3 and 4 above and back of the slide 175.

A lowering and pressure cam 200 acting on a roller 192, which is carried upon arms 194 swingable around the shaft 190 and having the forward extensions 195 connected to the slide 175, serves to initiate the downward movement and downward pressure, and it will be noted that the cam 200 has a cylindrical or dwell surface 201, the length of which determines the time during which the pressure members 160 and 185 are active. A cam 205 acting on the roller 210 connected with the arm members 194 and 195 provides for raising the slide and its dwell surface 206 holds the slide in its upper position during the transfer of work blanks from one station to another.

It will be noted that the cams 200 and 205 are separate offset cams, allowing for this movement. (Fig. 1). For the purposes of mere raising and lowering and creating the desired pressure, it may be assumed that these cams 200 and 205 and rollers 192 and 210 in connection with the slide may be made relatively rigid and that in the embodiment illustrated, they are capable of adjustments, but in action are relatively rigid after suitable adjustment is made.

The vertical positioning of the slide is accomplished by means of a screw 220 shown as actuated by a hand wheel 222 and connections whereby these adjustments are as follows:—First, it will be noted that the slide 175 is connected through ears 196, pins 197 and links 198, with a pair of pins 199, on the ends of bifurcated arms 207 embracing the links 198 and rockable upon the shaft 190 at either side of the hub member 193, with which the arms 194 and 195 are integral. The arms 207 are intermediately connected by a bridge member having a forward extension 225 threaded to receive a bolt 220 which has an upper extension journaled in a block 226 pivotally connected at 227 with the arms 195. In Fig. 6 the members 225 and 226 are in a position for the uppermost or nearly uppermost adjustment of slide 175 and by rotating the screw 220 by the handwheel 222, the threaded member 225 will be moved downwardly relative to the members 226 and arm 225, lowering the slide relative to the actuating arms and cam and pressure cam 200 and roller 192.

Another adjustment for convenience in assembly and provided with resilient means to avoid shock is provided by connecting the roller 210 with the actuating arms 194 and 195 through a rock link 212 pivoted at 213 on ears 214 on the hub member 193 for the arms 194 and 195, and rigid with this hub is a boss 216 through which extends a bolt 217 pivoted at 218 to the upper end of the rock link 212 and between the nut on its end and the boss 216 is a suitable compression spring 219. Rearward movement of this lever may be limited by an adjustable abutment provided as shown at 230, comprising a lock screw on an ear 231 on the arm 194.

Another safety mechanism for cutting out the motor, in case one of the work blanks is not properly seated or a foreign substance becomes interposed between the pressure members 160 and 185 and the object below, is provided. I provide, across the front of the slide 175, a rock shaft 250 for actuating a safety switch consequent upon such condition occurring with the pressure members 160. Above and at the rear of the slide a rock shaft 260 is provided for such condition at the pressure members 185. The rock shaft 250 is provided with a cam having a forwardly projecting shoulder 251 adapted to engage the corner edge of the block 164 upon its upward movement, there being one of such cams for each block. At the right hand end of the rock shaft in Fig. 1, is a cam member 254 actuating a vertically slidable rod 255 extending upwardly beyond and normally depressing and holding closed a switch indicated at 256, having spring means urging it normally to open. Upon rotation of the rock shaft 250 by engagement of the block 164 with the cam shoulder 251, the rod 255 is moved upwardly, releasing the switch 256 to open the motor circuit. This arrangement is indicated diagrammatically in Fig. 5.

A similar actuation of another motor line controlling switch occurs when the upper end of the slidable member 180 actuates the cam 261, rocking the shaft 260 and a cam at the end actuating another switch controlling rod 265.

*End contactor mechanism*

Figure 9:
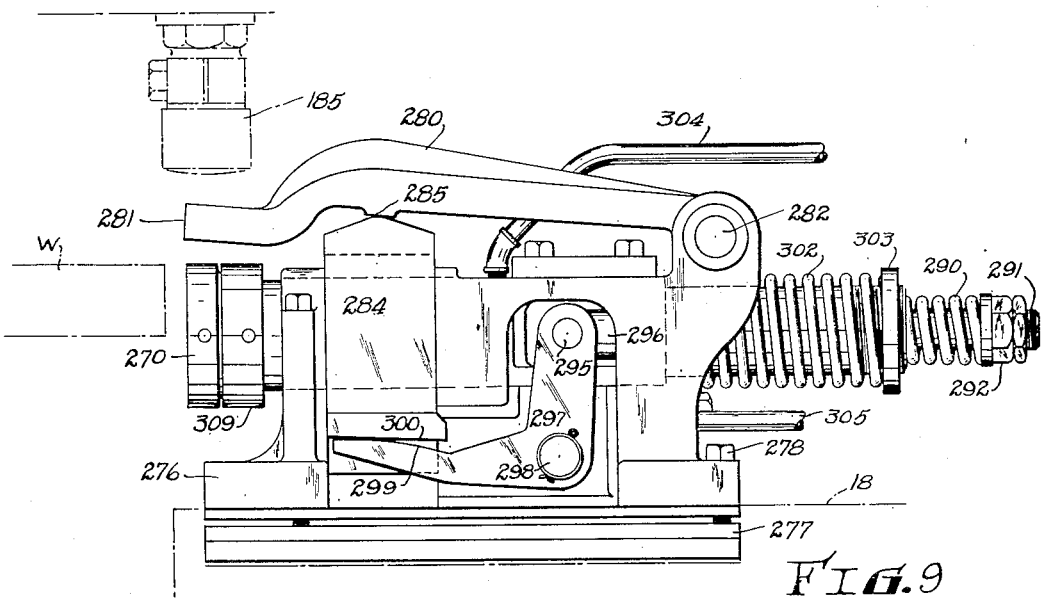
Fig. 9 is an enlarged side elevation of one of the contactors and its actuating means.
Figure 10:
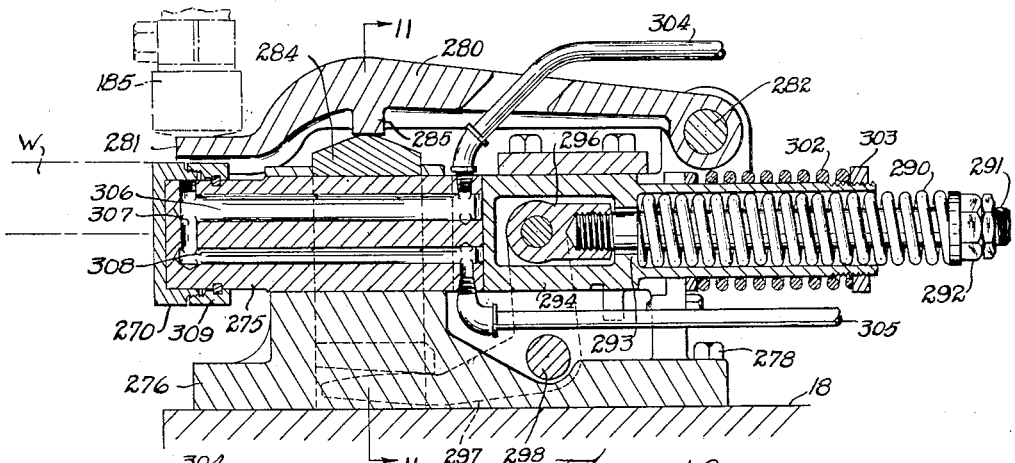
Fig. 10 is an enlarged sectional view of the same, being parallel to the plane of the view of Fig. 9.
Figure 11:
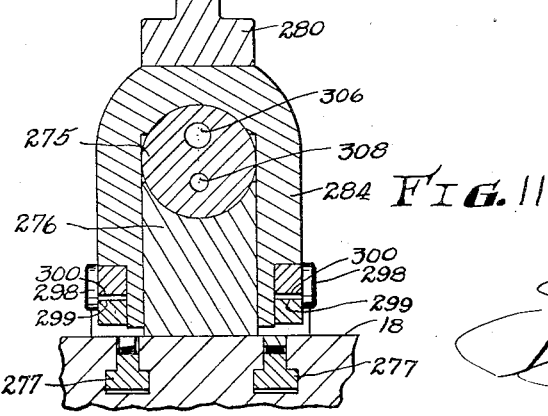
Fig. 11 is a transverse sectional view taken substantially on a plane indicated by the line 11 of Fig. 10.
Figure 12:
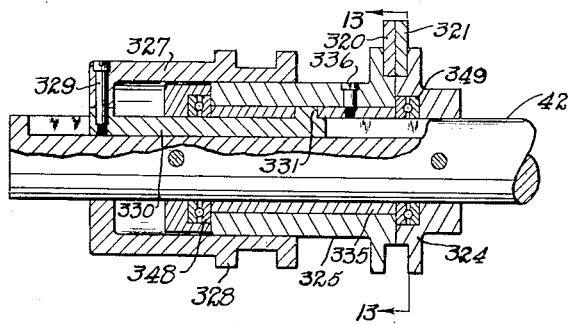
Fig. 12 is an enlarged sectional detail of the cams and adjusting means controlling the time of heating current application.
Figure 14:
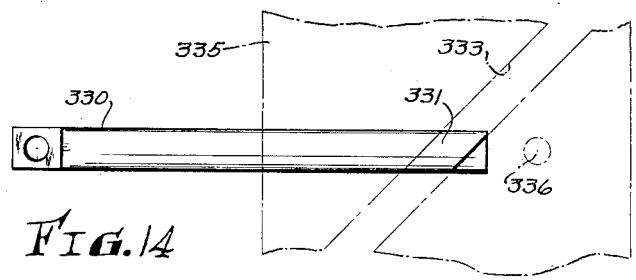
Fig. 14 is a detail of the connecting key which coacts with the cams and actuating sleeve.
Figure 13:
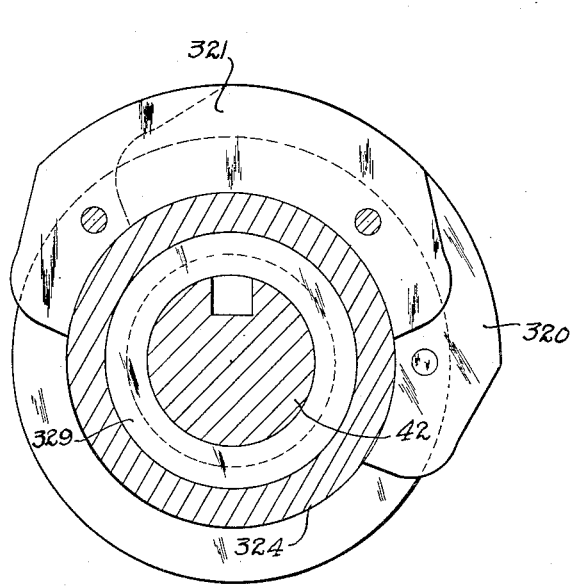
Fig. 13 is an enlarged transverse cross section of the timing device taken on the line 13—13 of Fig. 12.
Figure 15:
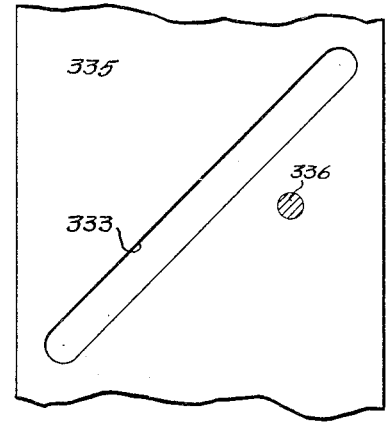
Fig. 15 is a development of the cam sleeve controlling the position of the cams coacting with the key of Fig. 14.

The work blank having been gripped between pressure member 160 and the contactor D, circuit is at once completed by moving an end contactor member 270 into engagement with this work blank. This movement is effected through mechanism now to be described by the downward movement of the pressure member 185. Referring more particularly to Figs. 9 to 11, the contactor member 270 is carried on the end of a horizontal plunger 275 slidably mounted in a suitable bearing formed in a casting. A suitable support having a base portion 276 is clamped onto the surface 18 of the table-like portion of the transformer member. This clamping arrangement is preferably such that longitudinal adjustment may be effected as by T clamps 277 in suitable T slots, clamping pressure being secured by screws 278 provided for positioning the plunger support at different points from the opposing contactor D.

It will be remembered that the pressure block 185 is similarly mounted for longitudinal adjustment to compensate for this adjustment and to bring the parts into suitable registration, whereby this contactor may operate the main pressure lever 280 of this contactor mechanism. This member is shown as having a forward horizontal portion 281 pivoted at 282 to the support. The bearing member for the plunger 275 is bifurcated to receive a vertically movable U-shaped slide 284 arranged to be urged downwardly by a boss 285 on the lever 280 and on the inside it is shown (Fig. 11) as closely fitting over the plunger 275 and downward pressure upon it assures good contact between the contacting surfaces of this sliding plunger and the base portion of the support, and also assures the support being in good contact with the surface 18 of the transformer member.

To first bring the plunger forwardly with predetermined pressure into contact with the work blank, I have shown an arrangement including an actuating spring 290 surrounding a link bolt 291 having a nut and washer arrangement at the outer end of the spring, while the inner end of the spring seats on an annular shoulder 293 at the inner end of the cylindrical recess receiving this spring, and formed in a rearwardly extending portion of the plunger 275. The inner end of the link bolt 291 is threaded into a link head 296 connected by a pin 295 at its outer ends with bell crank links 297 shown as pivoted on a fixed pin 298. At the forward end of each of these bell crank links is a rounded upper surface 299 engaging a substantially horizontal shoulder 300 on the bifurcated slide 284. As this slide is lowered, it will be seen that the first portion of its movement presses the forward end of the bell cranks 297, pulling forwardly upon the link bolt 291 and through the spring 290, pressing the contactor member 270 against the end of the work blank with a predetermined pressure depending upon the adjustment given the nut 292 on the link bolt 291. The last portion of the downward movement of the slide 284 effected by the lever 280 causes the slide to clamp the plunger 275 between it and the support as described.

A compression spring 302 surrounds the rearward extension of the plunger and between the support and adjusting nut 303 on the end thereof. This spring is of sufficient strength only to assure retracting or withdrawing the plunger upon its release by upward movement of the lever 280 and slide 284 and forward portion of the bell cranks 297.

Inasmuch as the contactor member 270 is subjected to great heat and considerable pressure, it is first desired to make it of highly refractory material capable of high conductivity, and second, it is desired to cool it in a suitable liquid cooling medium which may be brought thereto and taken therefrom through pipes 304 and 305, causing circulation through passages 306, 307 and 308. The forward section of the slide 275 is preferably of a highly conductive material while the rear portion is of nonconductive or of very much less conductive material, such as gun metal or the like. The contactor member preferably comprises a cap which may be of any suitable material and which may be fitted over the cylindrical forward end of the plunger secured by a rotatable nut ring, as indicated at 309 having internal threads holding it in position and allowing ready replacement.

Figure 8:
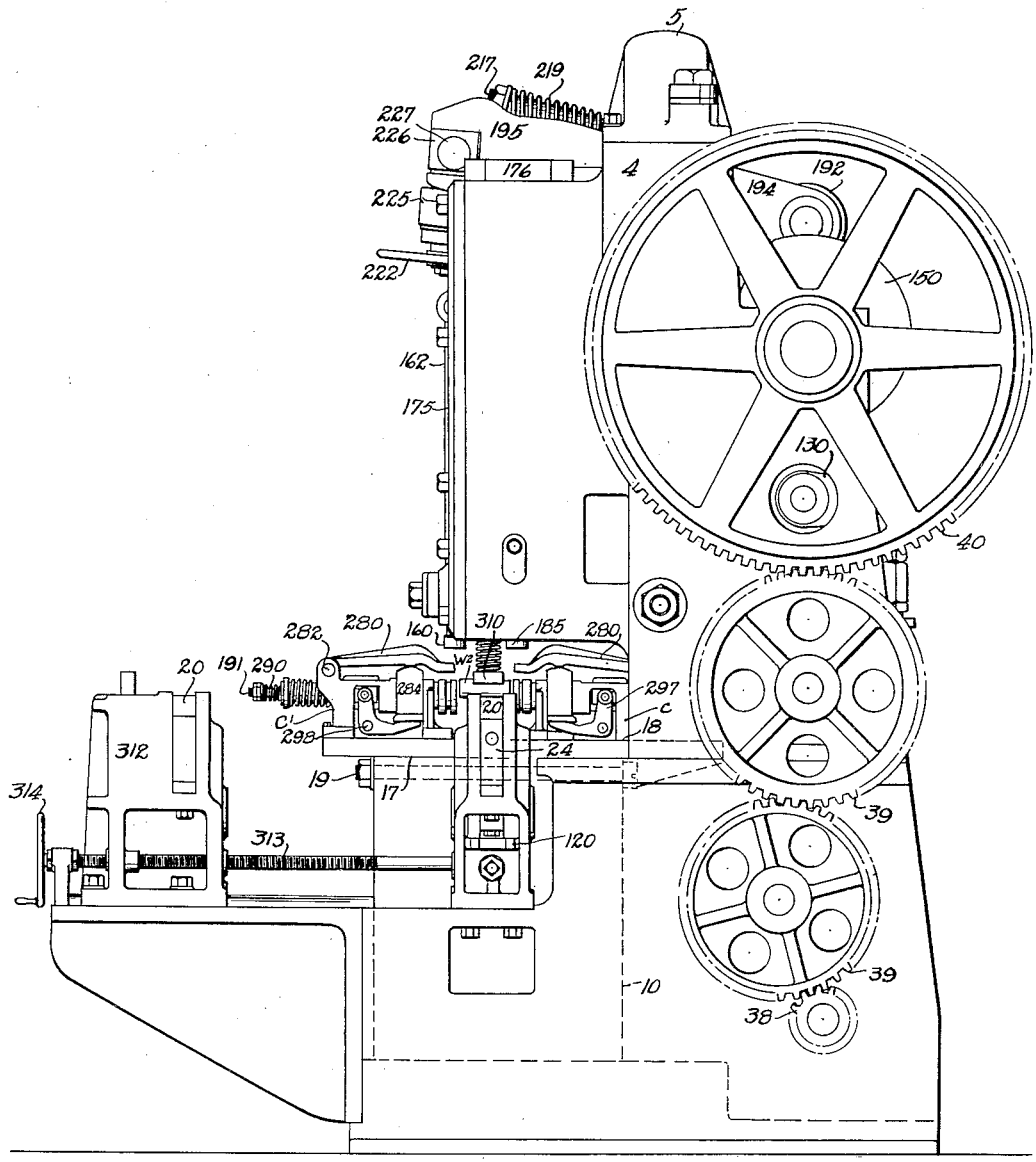
Fig. 8 is a side elevation showing a modified arrangement of the contactors for acting on a short type of article to be heated.

In Fig. 8 I have illustrated a modification using two of the contactor mechanisms such as just described, which provides for bringing the heating current to the ends of a shorter work blank such as illustrated at $W^2$. In this connection, contactor members such as just described are mounted also upon the other leg 17 of the transformer secondary, as indicated generally at C'. The levers 280 are then actuated by the pressure members 160, which are adjusted upwardly to give them the right height corresponding to the companion compression members 185. Merely to seat the work blanks in this arrangement short spring pressed plungers indicated at 310 are mounted on the lower part of the slide 175 over each recess rack bar 20.

It will be noted that the outer members 20 with their bridge members are moved to idle position in Fig. 8 by moving the slide members 312 by means of a pair of screws 313 and handwheels 314, the slides being mounted in suitable ways at the forward ends of the slides as shown. It will be understood that the shafts 72, 73 and 121 are of sufficient length to permit movement of the corresponding shafts actuated thereby toward and away from the main portion of the machine.

The control of the time of application of current to the primary of the transformer in an accurate predetermined relationship to the rest of the operation of the machine is very essential. In the present instant I use a control mechanism comprising a cam having an adjustable arrangement for the lengthening and shortening of its dwell period, during which actuating members hold the line switch closed. As heretofore mentioned, this arrangement is indicated generally at E in Fig. 7, controlling the line L. The cam arrangement is shown more in detail in Figs. 12 to 15.

Figure 4:
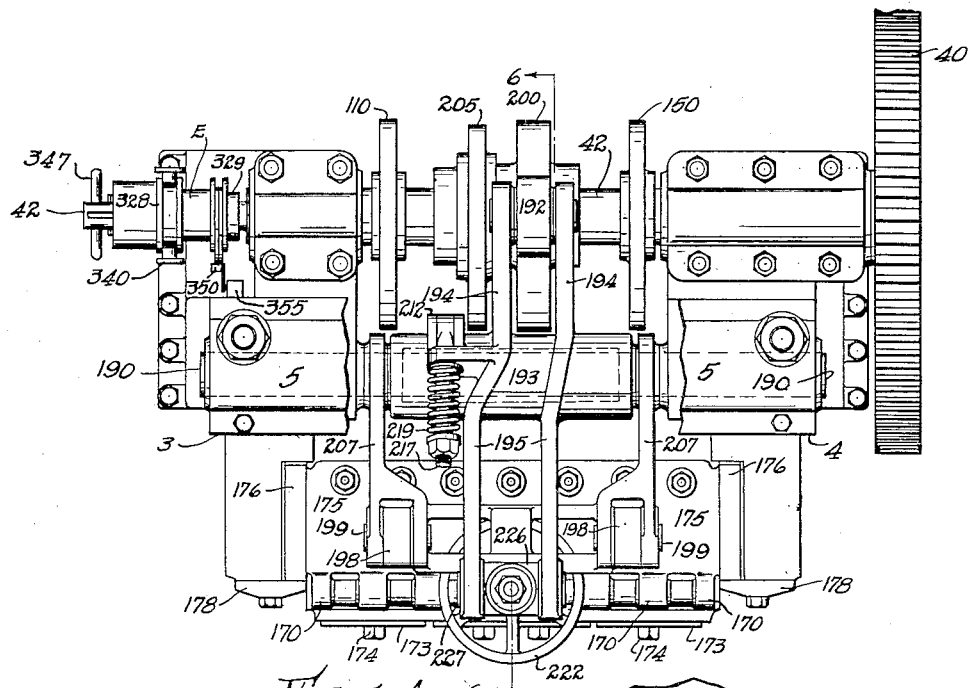
Fig. 4 is a plan view of the upper portion of the machine.

Referring first to Figs. 2 and 4, it will be seen that the shaft 42 has a reduced extension on which this mechanism E is mounted. The two cam members 320 and 321 in the form of segmental plates secured respectively to flanges of a collar 324 and sleeve 325 rotatable with the shaft and flange on the sleeve 325, having adjustment to different angular positions with relation to the shaft 42. Means for causing this relative angular movement as shown comprises a longitudinally movable collar 327 embracing the sleeve 325 and the shaft as shown, and connected by a screw or the like 329 to a slidable key 330, having an outward boss 331 fitted into a cam slot 333 formed in a collar 335, rotatably embracing the main shaft 42 and preferably connected as by a pin or screw 336 through the collar 325 and threaded into this sleeve.

A yoke 340 having rollers riding between flanges 328 on the collar 327 is shown as pivoted at 342 to a bracket on the side of the upright 3 of the frame of the machine, and at its lower end it is bifurcated to receive a nut block 344 threaded onto a screw 345 which may be rotated by handwheel 347. Rotation of this handwheel and screw moves the collar 327 along the shaft, moving with it the key 330 and through its boss 331 of cam slot 333 rotating the sleeve 325, carrying with it the cam 320, increasing or decreasing the combined length of the dwell surfaces at the outer faces of these cams. These dwell surfaces are shown of course as portions of a cylinder. The position on the shaft of the sleeves 325 and 335 is maintained between bearings 348 and 349, the bearing 348 being held by a collar pinned to the shaft as shown, while the bearing 349 is seated in the collar 324.

Actuated by the cam surfaces of the cams 320 and 321 is a roller 350 on the end of an actuating rock arm 352 having a switch member 354 indicated diagrammatically in Fig. 7, and shown as bridging the contacts of the switch mounted on the machine at 355 in closed position, this being for a time predetermined by the relative positions of the cams 320 and 321.

It will be seen that fine adjustment of this controlling period may be effected by movement of the handwheel from time to time to adjust for any variation which may occur in the current supply line, and of course to adjust generally for the predetermined condition for any particular work blanks.

From the foregoing description it will be seen that I have provided an electric heating means for treating a wide variety of blanks to be heated, and by application of heating current through direct short paths, without the use of flexible leads thereto, and in which the degree of heat may be accurately controlled for a given amount of the blank to be heated from a portion of the blank to the full blank from end to end.

The machine is capable of simple efficient construction and it will be seen that the various objects outlined in the foregoing are attained.

It is to be understood that various modifications and substitutions may be made in this machine without departing from the spirit of my invention, as defined in the appended claims.

Having thus described my invention, I claim:

1. In an apparatus for electrically heating metal blanks, the combination of a plurality of pairs of electrodes, and means for presenting work blanks thereto in predetermined order and for causing the engagement of the electrodes with the work pieces, means for causing the supply of heating current to the electrodes during said period of engagement, power means for actuating said engaging means and a safety mechanism for rendering the power means inactive consequent upon irregular conditions occurring at the points of engagement between the work blanks and contactors.

2. In an apparatus for electrically heating metal blanks, the combination of a pair of electrodes, and means for presenting work blanks thereto and for causing the engagement of the electrodes with the work piece, power means for actuating said engaging means, and a safety mechanism responsive to a differential movement between the power means and the means causing engagement of the electrodes with the work piece, for rendering the power means inactive consequent upon irregular conditions occurring at the points of engagement between the work blank and contactors.

3. In an apparatus for electrically heating metal blanks, the combination of a pair of electrodes, and means for presenting work blanks thereto and for causing the engagement of the electrodes with a work piece, power means for actuating said engaging means, and means for causing the contactors to engage the work blanks by pressure, said pressure means including safety devices responsive to a differential movement between the power means and the means causing engagement of the electrodes with the work piece, for rendering the power applying means inactive upon meeting irregular obstructions during operation.

4. In a machine of the character described, the combination of a plurality of pairs of contactors arranged in a uniform path, each pair being adapted to engage a work blank, means for supplying heating current to the contactors, feeding and transfer mechanisms for presenting the work blanks to the pairs of contactors, one at a time at predetermined intervals, pressure actuating means for causing engagement between the work blanks and contactors including a slide, having spring pressed plungers mounted thereon, and means for moving the slide in timed relation to the work blank feeding and transfer means.

5. In a machine of the character described, the combination of a series of pairs of contactors, each being adapted to engage a work blank, means for intermittently supplying heating current to the contactors, feeding mechanisms for presenting the work blanks to the contactors, pressure actuating means for causing engagement between the work blanks and contactors including a slide having pairs of spring pressed plungers mounted thereon, one pair for each pair of contactors, means for moving the slide in timed relation to the work blank feeding means, and current supplying means.

6. In a machine of the character described, the combination of a series of pairs of contactors, each being adapted to engage a work blank, means for intermittently supplying heating current to the contactors, feeding mechanisms for presenting the work blanks to the contactors, pressure actuating means for causing engagement between the work blanks and contactors including a slide having yeilding pressure elements for effecting contact between the blanks and contactors, and a driving mechanism including a shaft and cam means for actuating said slide in timed relation to the current application and feeding means.

7. In a machine of the character described, the combination of a series of pairs of contactors, each being adapted to engage a work blank, means for intermittently supplying heating current to the contactors, feeding mechanisms for presenting the work blanks to the contactors, pressure actuating means for causing engagement between the work blanks and contactors including a slide and contact effecting elements thereon, a cam shaft for operating said slide said means for supplying heating current to the contactors including a timing mechanism actuated in timed relation to said cam shaft.

8. In a heating apparatus of the character described, the combination with a suitable transformer for supplying heating current and provided with contactor supports, contactors mounted on said supports and adapted to engage a work blank, a pressure plunger for pressing the blank in one direction to one contactor and a pressure plunger for pressing the other contactor toward the blank at an angle to the first plunger and a common actuating means therefor.

9. In a heating apparatus of the character described, the combination with a suitable transformer for supplying heating current and provided with contactor supports, contactors mounted on said supports and adapted to engage the side and end of a work blank, a pressure means for pressing the blank at the side to one contactor, and a pressure means for urging the other contactor toward the end of the blank, and a common actuating means therefor, the latter contactor including a plunger and an actuating lever therefor.

10. In an apparatus of the character described, the combination with a transformer for supplying heating current to work blanks to be heated and having supporting surfaces, contactor members mounted on said supporting surfaces and adapted to engage and complete a heating circuit through the work blank, one of said contactors having a slidable plunger movable toward and away from the blank for causing engagement of one contactor surface with the work blank at one point of engagement and for pressing the plunger into close engagement with its supporting surface, and other pressure means for pressing the work blank at its other point of engagement with the other contactor member.

11. In a device of the class described, a pair of electrodes, means for presenting a work blank thereto, means for causing pressure engagement of the electrodes with the work blanks, power means for actuating the means for causing pressure engagement, said means comprising a source of power including a driving member, a first driven member actuated by said driving member, and a second driven member actuated by said first driven member, and safety means operable by movement of the first and second driven members relative to each other to render said source of power inactive.

12. In a device of the class described, a plurality of stations, said stations being arranged in a pathway, transfer means for advancing work pieces in a series of steps to successive stations along said pathway, power means for actuating the means for causing pressure engagement, said means comprising a source of power including a driving member, a first driven member actuated by said driving member, a second driven member driven by said first driven member, and safety means operable by movement of the first and second driven members relative to each other to render said source of power inactive.

13. In a device of the class described, a pair of electrodes, means for transferring work blanks to said electrodes and for removing work blanks from said electrodes, and means for causing pressure engagement of work blanks and electrodes, and power means for actuating the work transferring means and the means for causing pressure engagement of the electrodes and work blanks, the power means comprising a driving member, the means for actuating the work transferring means comprising a first driven member driven by the driving member, a second driven member driven by the first driven member, and safety means operable by movement of the first and second driven members relative to each other to render said driving member inactive, the means for actuating the means for causing pressure engagement of the work blanks with electrodes comprising a first driven member driven by the driving member, a second driven member driven by the first driven member and safety means operable by movement of the first and second driven members relative to each other to render said driving member inactive.

14. In a device of the class described, an electrode adapted to engage a work blank to be heated, the electrode comprising a plunger movable toward and away from the blank for causing engagement of said electrode with the blank, a support for the plunger, the support being connected to a source of electric current, means for moving the plunger relative to the support to effect engagement and disengagement with the work blank, means operable subsequent to the engagement of the plunger with the work blank to press the plunger into pressure engagement with the support whereby a good electrical connection is secured between the support and the plunger.

15. A device as described in claim 14, and in which there is a timing mechanism controlling the current application and operable in predetermined relation with the means for moving the plunger to complete the circuit to the plunger support subsequent to the pressing of the plunger into pressure engagement therewith, and operable to interrupt the circuit prior to the release of the pressure engagement of the plunger and support.

16. In a device of the class described, a heating station comprising a pair of electrodes adapted to engage a work blank to be heated, one electrode being adapted to engage the side of the work blank, the other electrode being adapted to engage the end of the work blank, means for effecting pressure engagement between the work blank and one of the electrodes, said means comprising a reciprocable slide, and means associated with the other of said electrodes and operable by said slide on movement of said slide to effect pressure engagement of the work blank and the first electrode to effect pressure engagement of the work blank and the other electrode.

17. In a device of the class described, a transformer having a primary and a secondary winding, the secondary comprising a single turn, each end of the secondary providing a supporting surface, an electrode mounted on each of said supporting surfaces, means for presenting a work blank to said electrodes, and means coacting in timed relation with said work presenting means for effecting pressure engagement of the work blank with the electrodes and of the electrodes with the supporting surfaces on the transformer secondary, by a movement delivered in the direction toward the transformer.

18. In a device of the class described, a plurality of electrodes each adapted to have pressure engagement with a work blank to be heated, and means effecting pressure engagement of the work blanks and electrodes, said means comprising a reciprocably movable slide, a plurality of plungers associated with said slide, each of said plungers being adapted to actuate one of the members to be forced into pressure engagement to force said member into pressure engagement with the other of said members, each of said plungers being yieldingly actuated by said slide, and means for periodically reciprocating said slide to effect operable connection of the plungers with the members to be actuated thereby.

JOHN R. BLAKESLEE.